US005442341A

United States Patent [19]

Lambropoulos

[11] Patent Number: 5,442,341

[45] Date of Patent: Aug. 15, 1995

[54] REMOTE CONTROL SECURITY SYSTEM

[75] Inventor: George P. Lambropoulos, Grosse Pointe Woods, Mich.

[73] Assignee: TRW Inc., Lyndhurst, Ohio

[21] Appl. No.: 866,906

[22] Filed: Apr. 10, 1992

[51] Int. Cl.[6] .......... H04Q 1/00

[52] U.S. Cl. .......... 340/825.31; 340/825.34; 340/825.69; 380/21

[58] Field of Search .......... 340/825.30, 825.31, 340/825.32, 825.69, 825.72; 380/21, 28, 36, 37, 43

[56] References Cited

U.S. PATENT DOCUMENTS

| | | | |
|---|---|---|---|
| 4,596,985 | 6/1986 | Bongard et al. . | |
| 4,743,898 | 5/1988 | Imedio | 340/825.31 |
| 4,847,614 | 7/1989 | Keller | 340/825.72 |
| 4,864,494 | 9/1989 | Kobus, Jr. | 340/825.31 |
| 4,881,148 | 11/1989 | Lambropoulos et al. . | |
| 5,055,701 | 10/1991 | Takeuchi | 340/825.69 |
| 5,107,258 | 4/1992 | Soum | 340/825.31 |
| 5,146,498 | 9/1992 | Smith | 380/21 |
| 5,159,329 | 10/1992 | Lindmayer et al. | 340/825.72 |
| 5,222,137 | 6/1993 | Barrett et al. | 380/21 |
| 5,253,296 | 10/1993 | Castleberry, Jr. et al. | 380/43 |

FOREIGN PATENT DOCUMENTS

| | | | |
|---|---|---|---|
| 451056 | 10/1991 | European Pat. Off. | 340/825.31 |
| 3432731 | 3/1986 | Germany | 340/825.31 |
| 2163579 | 2/1986 | United Kingdom | 340/825.31 |

*Primary Examiner*—Donald J. Yusko
*Assistant Examiner*—Brian Zimmerman
*Attorney, Agent, or Firm*—Tarolli, Sundheim & Covell

[57] ABSTRACT

A remote control keyless security system is presented herein for remotely controlling locking means mounted on a vehicle. A receiver is mounted on a vehicle. A remote transmitter includes a plurality of switches each representative of a control function to be performed and circuitry responsive to actuation of one of the switches for transmitting a digital signal having a security code, a sequence control code adapted to be sequentially changed in response to each actuation of a switch and a function code. The transmitter changes the sequence control code after each operation with the change being dependent upon information contained in the security code. The received security code is compared with a stored receiver security code. Circuitry responds to each occurrence of a match between the security codes for reading a stored sequence control code and changing it to define an updated sequence control code having a value dependent upon information contained in the stored security code. The updated sequence control code is compared with the received sequence control and an output indication is provided in dependence upon the comparison.

41 Claims, 5 Drawing Sheets

REMOTE CONTROL SECURITY SYSTEM

FIELD OF THE INVENTION

The present invention relates to the art of remote control of security systems and, more particularly, to controlling the locking and unlocking functions of a lock, such as on a motor vehicle's door or trunk lid or the like.

DESCRIPTION OF THE PRIOR ART

Remote control security systems are known in the art for controlling the locking and unlocking functions of a lock mounted on a motor vehicle and such systems typically comprise a receiver mounted on the vehicle proximate to the lock to be controlled and a portable handheld transmitter located remote from the receiver. A system such as that described above is disclosed in my U.S. Pat. No. 4,881,148, the disclosure of which is incorporated herein by reference. That patent discloses a system wherein a receiver has a memory which stores one or more security codes, each of which identifies a transmitter from which the receiver will validly receive a transmitted signal. Each transmitter is provided with a plurality of actuatable switches, each representative of a control function to be performed by the lock, such as an unlock function, or a lock function, or an unlock a truck lid function. Also, each transmitter includes circuitry that responds to the actuation of one of the switches to transmit a digital signal which includes a security code which uniquely identifies the transmitter from that of a plurality of similar transmitters, along with a function code representative of the particular control function to be performed by the lock. When a receiver receives such a digital signal it compares the received security code with each stored security code to determine if a match exists indicative that the receiver may validly receive the digital signal and respond thereto. If a match takes place, then the receiver responds to the function code for performing the control function requested, such as lock or unlock a vehicle door.

A concern with respect to such a system is that a would-be thief desiring entry into a locked vehicle may record the transmitted digital signal with appropriate radio frequency receiving equipment. Such recorded information may then be employed by such a thief for purposes of gaining access into such a locked vehicle.

In an effort to thwart the activities of a thief, systems have been devised which change the security code of the transmitter each time such a digital signal is transmitted and a corresponding change is made to the security code stored at the receiver. Thus, both the transmitter and the receiver may be provided with code generators which generate a succession of differently coded signals such that the security code is updated in the same manner at both the transmitter and the receiver after each operation. A system of this type is disclosed in the U.S. Patent to Bongard et al. U.S. Pat. No. 4,596,985.

The prior art noted above requires that the security code, sometimes referred to as access code or identity code, be changed after each operation. This may present a difficulty in that by making changes to the security code, then the security code transmitted by a transmitter may inadvertently be changed to a code that permits unwanted access to a receiver having the same security code.

The prior art noted above does not provide that the security code remain fixed and that the transmitted digital signal include an additional code which changes after each transmission such that the change is dependent upon information contained in the security code. Moreover, there is no teaching in the prior art that the additional code, sometimes referred to herein as a sequence control code, be received at the receiver for comparison with a similar sequence control code and which, after each operation, is updated by changing its digital value dependent upon information contained in the security code stored at the receiver.

In addition to the foregoing, the prior art noted above does not provide a teaching wherein the transmitted codes are scrambled or that the order of transmission of the codes be varied.

SUMMARY OF THE INVENTION

In accordance with one aspect of the invention, apparatus and method are provided whereby a transmitter remotely controls the locking and unlocking functions of a lock mounted on a vehicle or the like wherein the transmitter includes a plurality of selectively actuatable switches each representative of a function to be performed by the lock, such as lock or unlock a vehicle door or unlock a trunk lid. In response to actuation of one of the switches, a digital signal is transmitted by the transmitter with the digital signal including a first portion having a multi-bit security code uniquely identifying the transmitter from that of similar transmitters, a multi-bit sequence control code that is sequentially changed in response to each actuation of one of the switches and a multi-bit function code identifying one of a plurality of the control functions to be performed by the lock. The transmitter responds to each actuation of one of the switches for sequentially changing the digital value of the sequence control code with each change being dependent upon information contained in the security code that identifies the transmitter.

In accordance with another aspect of the present invention, a receiver is provided for use in receiving a digital signal as described above and wherein the receiver includes a memory that stores a multi-bit receiver security code which identifies a specific transmitter from which the receiver may validly receive a transmitted digital signal together with circuitry for comparing the received security code with the stored security code to determine if the codes match. A multi-bit sequence control code is also stored in memory in the receiver and circuitry is provided which responds to each occurrence of a match between the security codes for reading the stored sequence control code and changing its digital value to define an updated sequence control code having a digital value dependent upon information contained in the stored receiver security code. The updated sequence control code and the stored sequence control word are compared to determine whether a match exists and, if so, the lock is controlled to perform the function defined by the received function control code.

Still further in accordance with the present invention, a remote control security system is provided including a receiver as described hereinabove along with at least one transmitter as described hereinabove.

Still further in accordance with another aspect of the present invention, the transmitted digital signal includes a second portion having a multi-bit second code and wherein the codes in the first portion of the transmitted digital signal are scrambled in accordance with one of a plurality of scrambling algorithms and wherein the second code in the second portion of the transmitted digital signal includes information as to which one of the plurality of scrambling algorithms is employed.

Still further in accordance with another aspect of the present invention, the receiver de-scrambles the codes in the first portion of the received digital signal in dependence upon information contained in the received second code.

Still further in accordance with another aspect of the present invention, the codes in the first portion of the transmitted digital signal are arranged in order for transmission in accordance with one of a plurality of transmission order algorithms and that the second code includes information as to which one of the transmission order algorithms was employed for arranging the order of the codes.

Still further in accordance with another aspect of the present invention, the receiver rearranges the order of the codes in the first portion of the received digital signal based upon information contained in the received second code.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and wherein.

DESCRIPTION OF PREFERRED EMBODIMENT

Figure 1A:
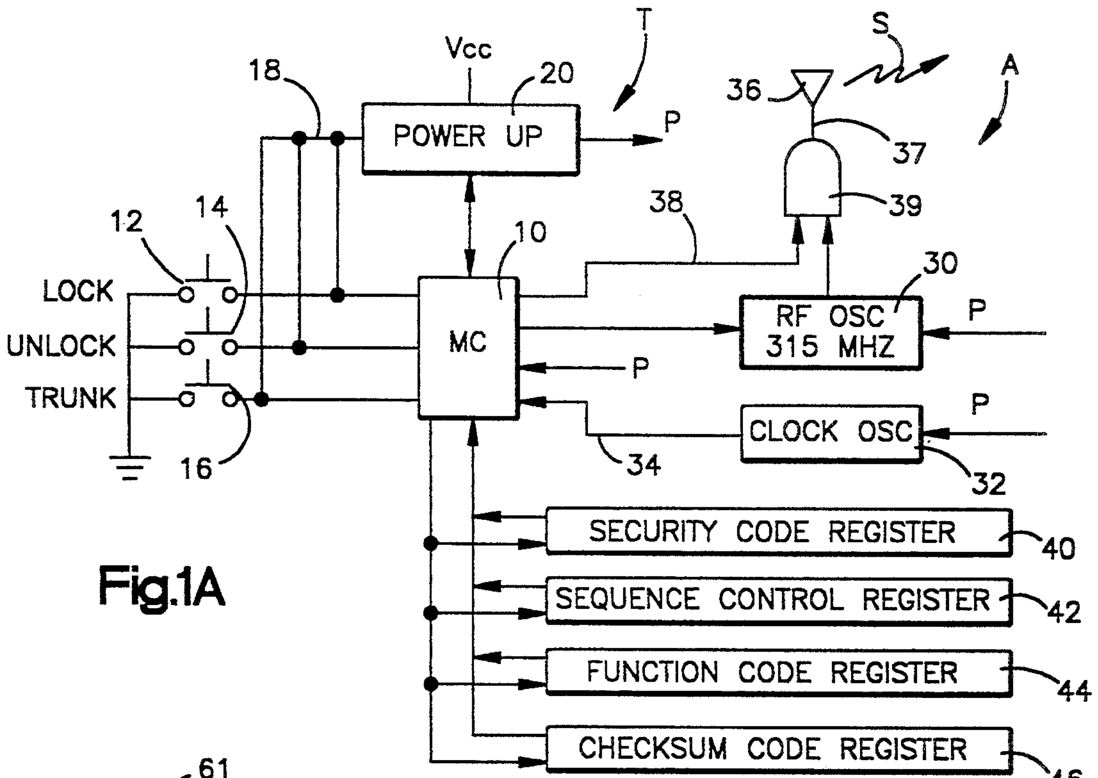
FIG. 1 is a schematic block diagram including FIGS. 1A and 1B respectively illustrating a transmitting unit and a receiving unit of a remote control security system employing the present invention.
FIG. 1C is a perspective pictorial view of the transmitting unit in the form of a keyholder.
Figure 1B:
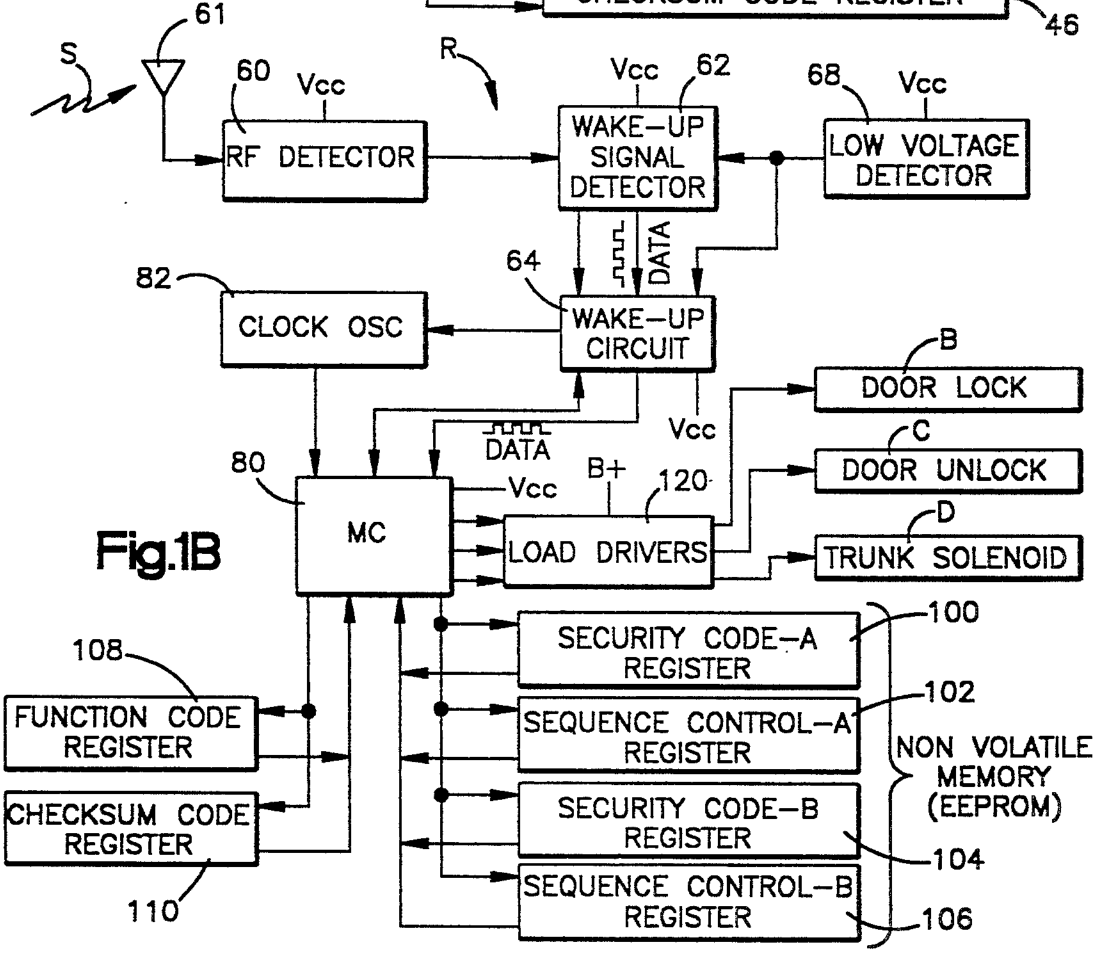

Reference is now made to the drawings wherein the showings are for the purpose of illustrating a preferred embodiment of the invention only, and not for the purpose of limiting same. FIG. 1 shows a remote control A for selectively operating a door lock mechanism B, door unlock mechanism C or trunk solenoid D to release the trunk of a motor vehicle. System A includes a transmitting unit T for creating a coded digital signal S to be transmitted to receiver unit R, whereby the doors of the vehicle can be locked or unlocked or the trunk can be released at will from a distance of at least 20–50 feet. Transmitting unit T includes a microcomputer having appropriate internal PROMs, EEPROMs and RAMs programmed to perform the functions of the system, as hereinafter described, and having sufficient I/O terminals controlled by selector means or switches 12, 14, and 16. In accordance with the illustrated embodiment, switch 12 is depressed when system A is to lock the doors of the vehicle by operating door lock mechanism B. In a like manner, switch 14 is manually operated to unlock the vehicle doors by actuating door unlock mechanism C. The trunk solenoid D or mechanism for unlatching the vehicle trunk lock is actuated by depressing manual switch 16. Upon depressing one of these switches 12–16, a power up circuit 20 is actuated to direct power to the microcomputer 10 and actuate oscillators 30 and 32. In the preferred embodiment switches 12, 14, and 16 power system A and cause a single transmission of a coded signal. Thereafter, circuit 20 is deactivated to await a new requested function.

Oscillator 30 has a nominal frequency of 315 MHz, in the preferred embodiment, which frequency is essentially the same frequency employed for common garage door operators. Whereas the invention is described herein with reference to an RF system, it may also be practiced with an IR system. Clock oscillator 32 is unregulated in that it does not have a crystal control and may vary as to its frequency with temperature changes and manufacturing tolerances. The output of oscillator 32 is used to time the function of microcomputer 10 to shift output line 38 to a logic 1 whenever a binary 1 is to be transmitted by antenna 36. Microcomputer output line 38 is one input of AND gate 39 having a second input controlled by the output of oscillator 30. The signal in output line 37 of gate 39 is a series of binary conditions (logic 0 and logic 1 superimposed on a 315 MHz carrier. Consequently, transmitted signal S, when microcomputer 10 is powered by circuit 20, will be a series of pulses having a length or duration controlled by the logic in line 38. Lines P are power lines actuated upon command of circuit 20.

As will be described later, the code in signal S is binary, with a binary 1 and a binary 0 being distinguished from each other by having a difference in length or duration. This pulse length is controlled by the frequency of oscillator 32 which is not a high priced oscillator with quartz control; therefore, the relationship between a binary 0 and a binary 1 for the identification code in transmitted signal S is the relative pulse lengths of a logic 1 and a logic 0. These lengths vary according to the particular frequency of oscillator 32 but maintain their numerical relationship since they are based upon counts of the clock in line 34. In this manner, oscillator 32 can be relatively inexpensive but the frequency or clock in line 34 will not be identical from one transmitter T to another transmitter. Indeed, during different operating conditions in a particular transmitting unit the clock in line 34 can drift in frequency.

By employing the power up concept, power at lines P is not applied to the oscillators and the microprocessor until there is a selection by depressing one of the switches 12–16. When this occurs, power up circuit 20, which includes a battery (normal 5.0 volts), directs power to the microcomputer for a time which is controlled by the microcomputer. The length of the time the microcomputer maintains power is sufficient to transmit one control signal. This signal includes, in practice, a wake up signal, at least one initiation bit, eight bits of checksum code thirty-two bits of security code, twenty-four bits of sequence control code, and eight bits of function code to indicate which switch 12–16 has been closed.

Figure 1C:
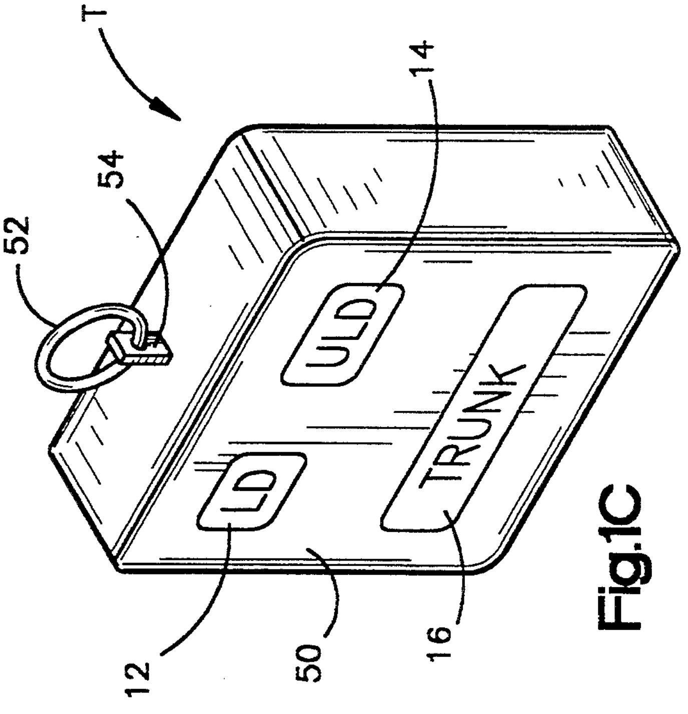

As illustrated in FIG. 1C, transmitting unit T is a handheld key ring having an appropriate array of finger tip switches 12–16, in a case 50 which can include a key ring 52 on a swivel connection 54. Transmitter case 50 is a small hollow housing containing the transmitter circuitry and a power source, such as a battery. The case is adapted for easy transportation in a person's pocket. The handheld case 50 is retained by the operator of the vehicle so that as the operator approaches the vehicle, signal S can be transmitted to receiver R by merely depressing one of the finger operated switches 12–16 mounted in the case 50 and manually operable from outside of the case.

The microcomputer 10 of the transmitter is provided with internal memories including PROMs, EEPROMs and RAMs. As is well known, such memories include registers for storing multi-bit codes. Whereas these registers are internal of the microcomputer 10, four of these registers are illustrated in FIG. 1 to assist in the explanation of the invention. These registers include a security code register 40, a sequence control code register 42, a function code control register 44 and a checksum code register 46. Registers 40 and 42 are in the EEPROM memory whereas registers 44 and 46 are in RAM. The security code register 40 contains a fixed code which uniquely identifies the transmitter T from that of other similar transmitters. The register contains a security code which is fixed in the transmitter by the manufacturer and may be implemented in a manner described hereinbefore with my previous U.S. Pat. No. 4,881,148. The security code preferably takes the form of four eight bit bytes.

Another register 42 is referred to herein as the sequence control code register and it stores a sequence control code which is preferably twenty-four bits long divided into three eight bit bytes. As will be brought hereinafter, the digital value of the sequence control code is changed each time one of the switches 12, 14 or 16 is actuated and, hence, this is a sequentially changing code. This code is changed in accordance with one of a plurality of sequence control algorithms stored in a look-up table in the transmitter microcomputer 10. Also, as will be brought out in greater detail hereinafter, the determination as to which one of the plurality of sequence control algorithms to be employed is determined by examining information contained in the security code stored in register 40.

A function code register 44 serves to temporarily store the function code to be transmitted as part of a transmitted digital signal S. This preferably takes the form of an eight bit coded byte with the bits being arranged in response to actuation of one of the switches 12, 14, 16 so that the function represented thereby is to either lock the vehicle door, unlock the vehicle door or unlock the trunk lid by actuating the trunk solenoid.

Another register in the microcomputer 10 is a checksum code register 46. This register contains an error detecting code known as a checksum code. This code is placed into the register by the microcomputer under program control in a known manner. For example, the data to be transmitted is examined and an eight bit checksum code is placed into the register for use in verifying the accuracy of the transmitted signal.

Figure 2:
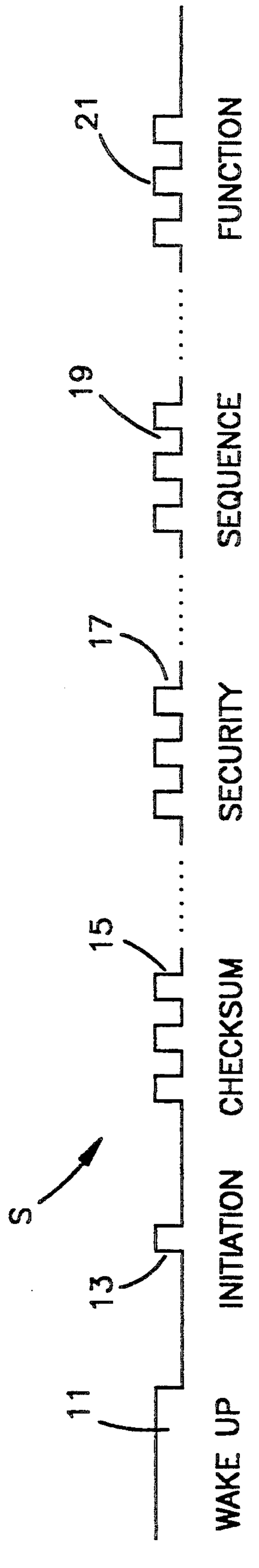
FIG. 2 is an illustration of voltage with respect to time illustrating the waveform of a transmitted digital signal provided by the transmitting unit herein and which illustration is useful in describing the invention herein.

The transmitted digital signal S is illustrated in FIG. 2 and it includes a wake up portion 11 and which may comprise a single bit, but which is of an elongated duration such as on the order of twelve milliseconds and this is followed by a start or initiation portion 13 and which may comprise four bits. The checksum code 15 includes 8 bits and the security code 17 contains 32 bits. The sequence control code 19 contains 24 bits and the function code 21 contains eight bits. As will be brought out in greater detail hereinafter, the digital signal is transmitted in the order of the wake up code 11, followed by the initiation code 13. This is followed by an eight bit checksum code, four eight bit bytes of security code, three eight bit bytes of sequence code and an eight bit function code. The checksum code in this embodiment of the invention will always be in the same place. For example, this code may be the first byte of the nine bytes which follow the transmission of the initiation bits. The remaining eight bytes may be varied in sequence and/or scrambled as will be discussed hereinafter. Moreover, the digital value of the sequence control code is changed with each transmission of a digital signal.

The receiver R includes an RF detector 60 tuned to the transmitted frequency of 315 MHz so that, as the digital signal S is received at the receiver's antenna 61, the detector recognizes the frequency of the signal and allows the first portion including the wake up portion 11 to pass to a wake up signal detector 62. The detector 62 checks to see if the wake up condition is proper and, if so, it activates the wake up circuit 64. Circuit 64 acts as a power up circuit for supplying operating voltage, such as 5 volts, to the receiver's microcomputer 80. The operating voltage is monitored by a low voltage detector 68 to permit operation of the circuitry so long as the voltage does not drop below a selected level.

The data in the received digital signal S is supplied to the microcomputer 80 and is clocked in by clock pulses obtained from a clock oscillator 82. The microcomputer 80, as in the case of the microcomputer 10, includes a plurality of internal memories including PROMs, RAMs and EEPROMs. The internal memories are programmed to perform the functions to be described in greater detail hereinafter.

Some of the internal memories of the microcomputer 80 are illustrated in FIG. 1 to assist in the description of the invention herein. These include registers 100, 102, 104 and 106 which are all in the non-volatile memory (EEPROM). Register 100 stores a security code A that uniquely identifies a transmitter from which the receiver may validly receive a digital signal. The code set into register 100 may be placed in the memory at the factory or may be programmed in the field in the manner as described in my previous U.S. Pat. No. 4,881,148. The security code is generated by means of an algorithm which has the capability of generating numbers in a random, but not repeatable, fashion. This code is thirty-two bits in length and is divided into four eight bit data bytes. As it may be desirable for the receiver to validly receive digital signals from more than one transmitter, a second security code register 104 is provided, identical to that of register 100, but which includes a security code B which is uniquely different from that of security code A in register 100.

In addition to register 100, the receiver includes a companion register 102 which has been programmed to contain a multi-bit sequence control code. As discussed herein with respect to the transmitter, this code is a twenty-four bit code divided into three eight bit bytes. This code is varied by a predetermined amount, known only to the manufacturer, each time the receiver has determined that it has received a valid digital signal, as will be described in detail hereinafter. Since it may be desirable to validly receive a digital signal from a second transmitter, a second sequence control code is stored in a second register 106 and in a like manner this sequence control code is changed each time the receiver has determined that it has validly received a digital signal from the second transmitter (or B transmitter)

Also, to assist in describing the invention herein, there is shown in FIG. 1 a pair of registers located in internal memory of the microprocessor 80 and these include a function code register 108 and a checksum code register 110. These are temporary memories and respectively serve to receive and store the function code and checksum code portions of the digital signal S received from the transmitter T.

As will be described hereinbelow, if the receiver validly receives a digital signal from a transmitter, it will then decode the function code in register 108 and perform one of the door lock control functions such as locking a vehicle door or unlocking a vehicle door or actuating a trunk solenoid by way of suitable load drivers 120 controlled by the microcomputer 80.

Figure 3:
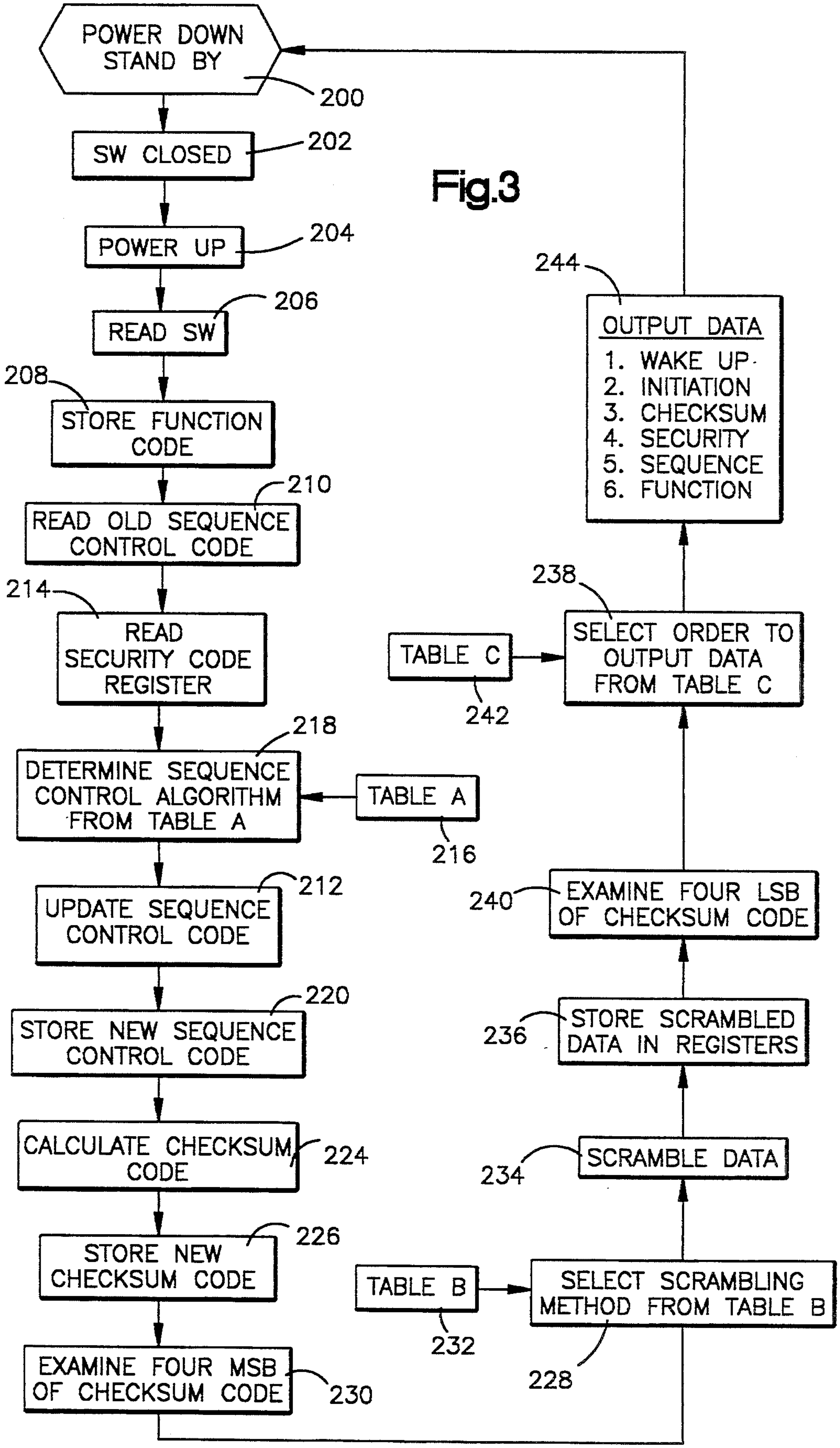
FIG. 3 is a flow diagram illustrating the operation of the programmed microcomputer employed in the transmitter of FIG. 1.

Reference is now made to FIG. 3 which illustrates the flow chart showing the manner in which the microcomputer in the transmitter is programmed in accordance with the present invention. Initially, the transmitter is at rest in a standby condition sometimes known as a power-down condition, and this is indicated as step 200 in FIG. 3. The microcomputer is now awaiting closure of one of the switches 12, 14 or 16.

In step 202, the microcomputer responds to the closure of one of the switches 12, 14 or 16 and initially actuates the power up circuit 20 in accordance with step 204 for purposes of applying power on lines P to the various circuits within the transmitter.

In step 206, the microcomputer is programmed to read the actuated switch to determine which switch 12, 14 or 16 was actuated and then store the function code associated with that switch in the function code register 44 in accordance with step 208. The function code stored in the register 44 now represents the specific request, such as lock the vehicle door or unlock the vehicle door or unlock the trunk lid.

In step 210, the microcomputer reads the present or old sequence control code from the register 42 in order to update the sequence control code in accordance with step 212. The computer performs a read function at step 214 wherein the security code register is read to obtain the security code for this transmitter. Having obtained the security code from register 40, the computer now reads from a look-up table A, pursuant to step 216, to determine which one of a plurality of sequence control variation algorithms is to be employed in determining the new sequence control code in accordance with step 218. Once the correct algorithm has been obtained from Table A in accordance with step 216, the next or new sequence control code is determined to obtain an updated sequence control code in accordance with step 212. This new sequence control code is then stored in the sequence control register 42 pursuant to step 220.

Reference is now made to Table A produced below.

TABLE A

SEQUENCE CONTROL CODE METHOD OF VARIATION
Security Code: Axxxxxxx Bxxxxxxx Cxxxxxxx Dxxxxxxx

| ABCD | | |
|---|---|---|
| 0000 | Increment by | 1 |
| 0001 | | 3 |
| 0010 | | 5 |
| 0011 | | 7 |
| 0100 | | 9 |
| 0101 | | 11 |
| 0110 | | 13 |
| 0111 | | 15 |
| 1000 | Decrement by | 1 |
| 1001 | | 3 |
| 1010 | | 5 |
| 1011 | | 7 |
| 1100 | | 9 |
| 1101 | | 11 |
| 1110 | | 13 |
| 1111 | | 15 |

As shown in Table A, the security code SC is comprised of four eight bit bytes. The most significant bits of these bytes may respectively be referred to as bits A, B, C and D and which are arranged in the lefthand column under the title ABCD. Sixteen variations of the digital value of this four bit number are represented in Table A, each providing a different algorithm for changing the present sequence control code to the next digital value of the sequence control code. For example, if the bits ABCD have a digital value of 0010, then the new sequence control code is determined by taking the old or present sequence control code and incrementing it by five. Similarly, if the digital value of the word ABCD in Table A is 0101, then the sequence control code is incremented by eleven to obtain the new digital value of the sequence control code. It is noted that the last eight algorithms in this Table provide for a decrement in the value of the sequence control code.

Continuing now with the programmed operation of the microcomputer, it is seen that in step 224, the transmitter microcomputer calculates the checksum code by examining the bits in the security code, the sequence control code and the function code. A binary addition is performed on these eight bytes in order to calculate the checksum code. In accordance with step 226, the calculated checksum code is then stored in the transmitter checksum code register 46 prior to assembling the various bytes for transmission in the digital signal S.

Before the bytes of the digital signal S are transmitted by the transmitter T, the bits in each of the bytes forming the security code SC, the sequence control code SSC and the function code are scrambled in accordance with one of a plurality of scrambling algorithms as set forth in Table B below.

TABLE B

KEY TO SCRAMBLING METHOD

| CHECKSUM CODE | SCRAMBLING METHOD | |
|---|---|---|
| 0000 xxxx | 1. XOR with SCC-1 - Shift Left | 1 & Invert |
| 0001 xxxx | 2. XOR with SCC-1 - Shift Left | 1 |
| 0010 xxxx | 3. XOR with SCC-1 - Shift Left | 2 & Invert |
| 0011 xxxx | 4. XOR with SCC-1 - Shift Left | 2 |
| 0100 xxxx | 5. XOR with SCC-1 - Shift Left | 3 & Invert |
| 0101 xxxx | 6. XOR with SCC-1 - Shift Left | 3 |
| 0110 xxxx | 7. XOR with SCC-1 - Shift Left | 4 & Invert |
| 0111 xxxx | 8. XOR with SCC-1 - Shift Left | 4 |
| 1000 xxxx | 9. XOR with SCC-1 - Shift Right | 1 & Invert |
| 1001 xxxx | 10. XOR with SCC-1 - Shift Right | 1 |
| 1010 xxxx | 11. XOR with SCC-1 - Shift Right | 2 & invert |
| 1011 xxxx | 12. XOR with SCC-1 - Shift Right | 2 |
| 1100 xxxx | 13. XOR with SCC-1 - Shift Right | 3 & Invert |
| 1101 xxxx | 14. XOR with SCC-1 - Shift Right | 3 |
| 1110 xxxx | 15. XOR with SCC-1 - Shift Right | 4 & Invert |
| 1111 xxxx | 16. XOR with SCC-1 - Shift Right | 4 |

With reference to Table B, it is seen that the scrambling algorithm employed is determined by examining the four most significant bits of the checksum code. The term SCC-1 refers to the first byte of the sequence control code SCC. In this Table, it is seen that it is possible to have as many as sixteen different methods of scrambling which adds to the degree of difficulty in attempting to analyze a captured signal as by a thief or the like. Thus, for the moment, assume a checksum code of 00110000. An examination of the four most significant bits indicates that the scrambling algorithm employed is algorithm No. 4 which directs that each byte of the data to be transmitted (with the exception of the checksum code) be combined in an exclusive OR manner with the first byte SCC-1 of the sequence control code. That combination is then shifted left by two places without an inversion taking place. Similar calculations are shown for other combinations in Table B. The algorithms, as set forth in Table B, are stored in the transmitter's microcomputer memory, such as in ROM in a manner well known in the art.

In step 228 the programmed microcomputer selects the scrambling method to be employed by using the four most significant bits of the checksum code (represented at 230) to address Table B, represented at 232, in order to fetch one of the sixteen scrambling algorithms to be used. The bits within the data bytes, with the exception of the checksum code, are then scrambled in accordance with the selected scrambling algorithm in step 234 with the scrambled data then being stored in accordance with step 236 in registers 40, 42 and 44.

The eight data bytes to be transmitted include four bytes of security code, three bytes of sequence control code and one byte of function code. In addition to scrambling these bytes as discussed above with respect to steps 228, 230, 232 and 234, the scrambled bytes may be transmitted in an order other than that as depicted in FIG. 2. The checksum byte is always in the same position. In the example given herein, the checksum byte is in the byte 1 position of the nine bytes following the wake up and initiation bits. The remaining eight data bytes are transmitted in one of sixteen different transmission orders as set forth in Table C below.

TABLE C

| CHECKSUM CODE | KEY TO OUTPUT ORDER | |
|---|---|---|
| xxxx 0000 | Output order | 1 |
| xxxx 0001 | | 2 |
| xxxx 0010 | | 3 |
| xxxx 0011 | | 4 |
| xxxx 0100 | | 5 |
| xxxx 0101 | | 6 |
| xxxx 0110 | | 7 |
| xxxx 0111 | | 8 |
| xxxx 1000 | | 9 |
| xxxx 1001 | | 10 |
| xxxx 1010 | | 11 |
| xxxx 1011 | | 12 |
| xxxx 1100 | | 13 |
| xxxx 1101 | | 14 |
| xxxx 1110 | | 15 |
| xxxx 1111 | | 16 |

As is seen from examining Table C, the selection of one of the sixteen output orders is controlled by the four least significant bits of the checksum code. Thus, if the four least significant bits of the checksum code are 0111, then the order of transmitting the data bytes will be output order No. 8 out of the potential output orders one through sixteen. The exact order of transmitting the data is not presented herein as various combinations may used for any one of the possible sixteen orders. For example, output order No. 4 may take the following sequence: SCC1, SC1, SC2, SC3, SC4, function code, SCC2 and SCC3 (it being understood that SC1 stands for security code byte one, etc., whereas SCC1 stands for sequence control code byte 1, etc.). Similarly, output order No. 6 (0101) may require that the order be as follows: SC1, SCC1, function code, SC3, SCC2, SC2, SCC3 and SC4. Similarly, output order No. 8 (checksum code xxxx0111) may require the following transmission order: function code, SC3, SCC2, SC1, SCC3, SC4, SCC1 and SC2. Table C is contained in a look-up memory in the transmitter's microcomputer in a known manner.

In step 238, the transmitter's microcomputer selects the order in which to output the data bytes described hereinabove. To do so, the microcomputer examines the four least significant bits for the checksum codes stored in register 46, and uses those bits to access Table C containing the order information. The data to be transmitted is then re-ordered according to the order information read from look-up Table C. Data is then transmitted in the new order. The transmission is performed in step 244, wherein the wake up and initiation bits are initially transmitted, followed by the checksum byte and the eight data bytes (organized in the new order) representing the security code, the sequence control code and the function code. The transmitter is then powered down to await a switch closure commanding another transmission of a digital signal.

Figure 4A:
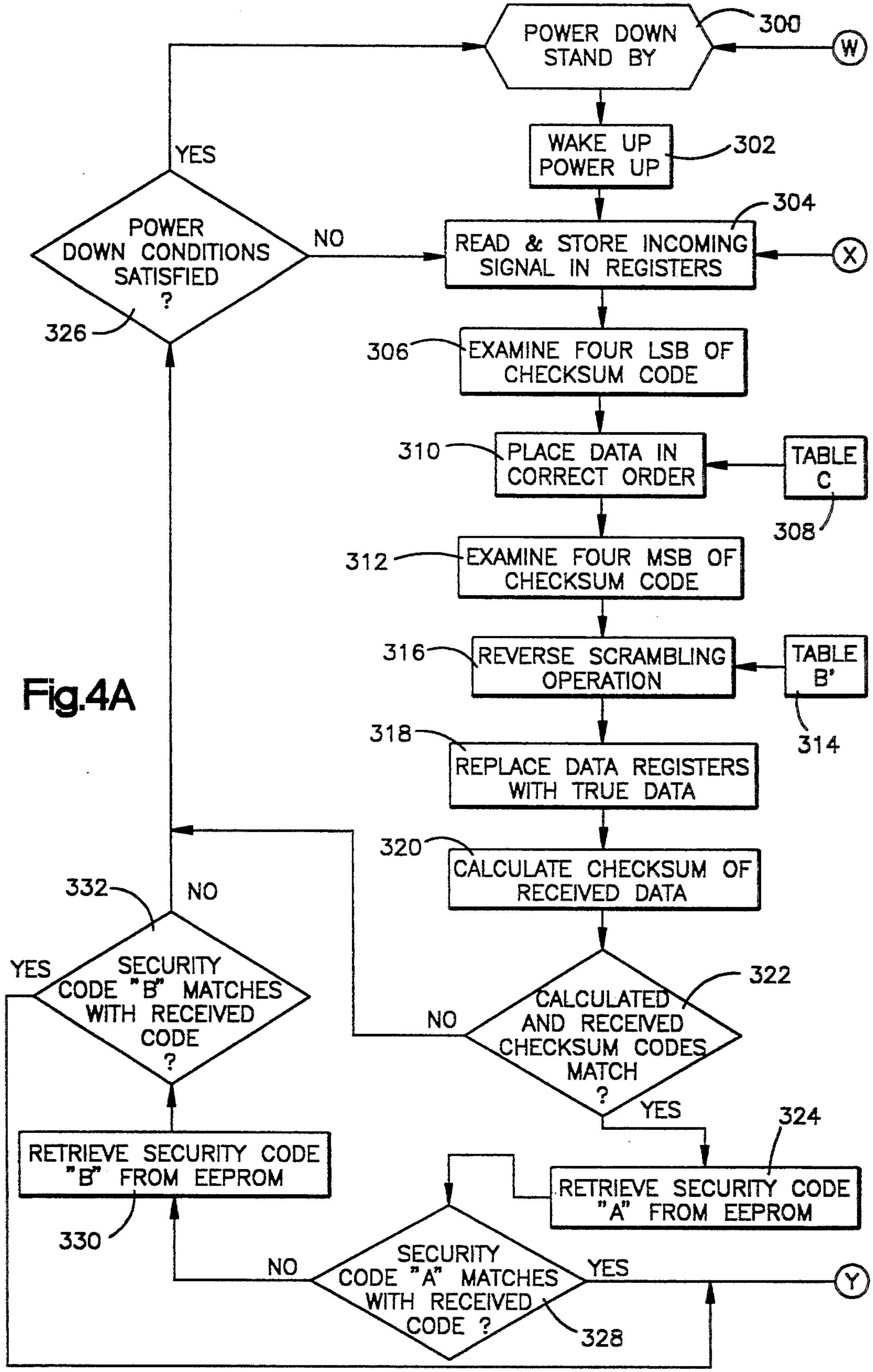
FIG. 4 is the flow diagram including FIGS. 4A and 4B together illustrating the programmed operation of the microcomputer employed in the receiver of FIG. 1.
Figure 4B:
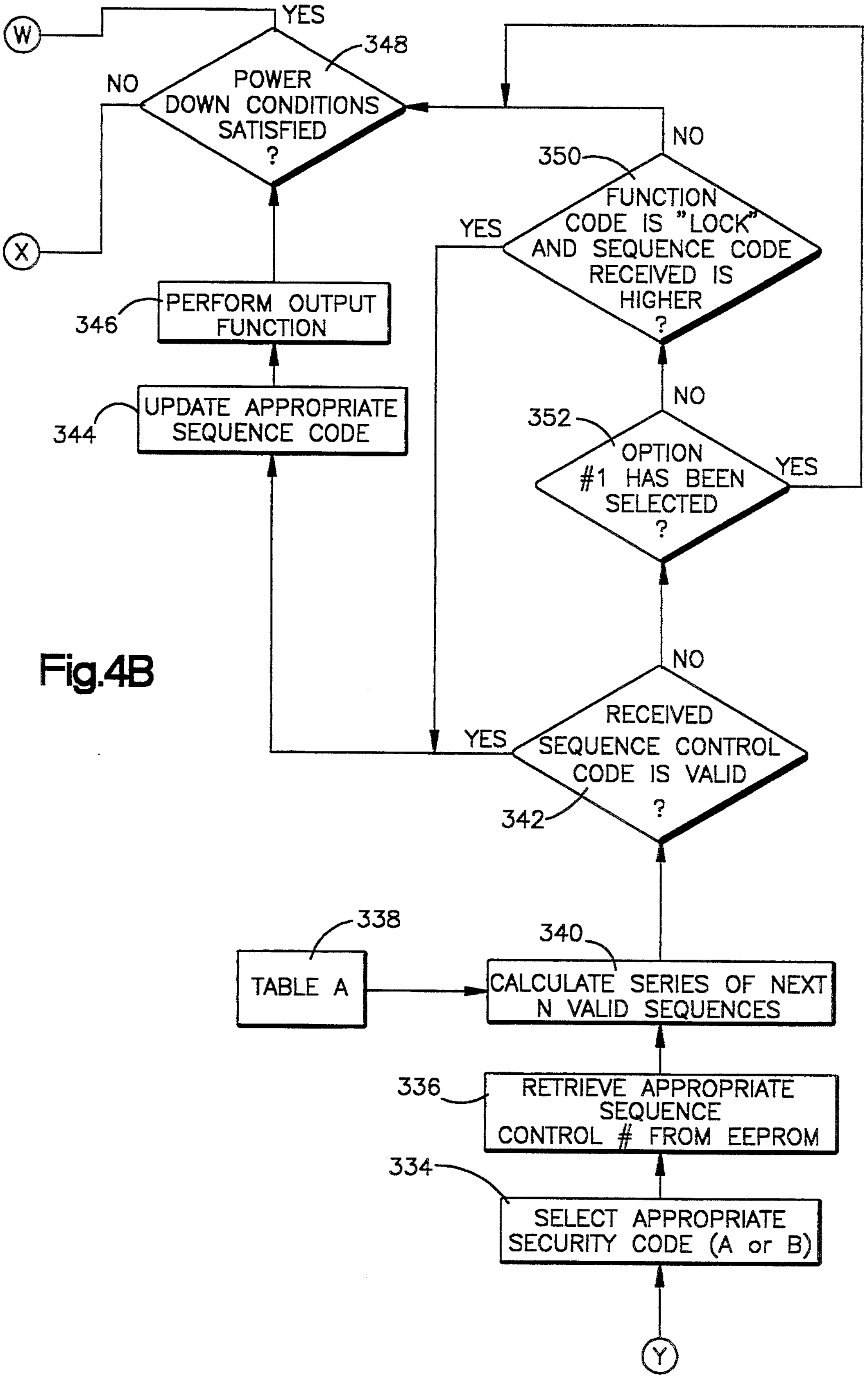

Reference is now made to FIG. 4 which presents a flow chart showing the manner in which the microcomputer in the receiver R is programmed to accomplish various functions to be described herein. Initially, in accordance with step 300 the receiver is in a power-down standby condition awaiting reception of a digital signal S from a transmitter, such as transmitter T. When such a signal is received, the wake-up bit will activate the wake up signal detector 62 and, as represented in step 302, will cause the wake-up circuit 64 to power up and provide power to the microcomputer 80 within the receiver. In step 304, following the microcomputer's usual initiation steps, the microcomputer responds to the start or initiation portion of the digital signal to read the incoming digital signal and store same in the temporary registers in the microcomputer. As stated above, the incoming digital signal is scrambled and the data bytes are out of order with the exception of the checksum code. This code is always in the same place. In the example being described it is in byte position one of the nine bytes that follow the initiation and wake up bits. The checksum code byte is stored in the checksum code register 110 at the receiver R.

In accordance with step 306, the four least significant bits of the checksum code stored in the receiver register 110 are examined to determine which of a plurality of sixteen transmission orders was employed in transmitting the eight data bytes to the receiver. In step 310 the four least significant bits of the checksum code are used to access a look-up table (indicated at step 308) in the receiver's microcomputer memory. This table is the same Table C discussed hereinbefore. Thus, for example, if the four least significant bits of the checksum code are 0101, order No. 6 will be retrieved from Table C. That order may have the data bytes arranged as follows: SC1, SCC1, function code, SC3, SCC2, SC2, SCC3 and SC4. Employing this information from the look-up table in step 310, the data bytes are now placed in the correct order and stored in appropriate temporary memory registers in the receiver's microcomputer.

In step 312, the receiver's microcomputer examines the four most significant bits of the checksum code stored in the microcomputer's register 110. From the previous discussion of Table B it will be recalled that the four most significant bits of the checksum code determine which one of sixteen scrambling algorithms was employed at the transmitter to scramble the eight data bytes. Similarly, the four most significant bits of the checksum code received and stored in the checksum code register 110 at the receiver R are used to choose a complementary descrambling method for restoring the data bytes to their original form. Consequently, the inverse of Table B is stored in a look-up table B' in the receiver's microcomputer, such as in ROM.

This Table B' is like Table B, except that the stored instructions accomplish the de-scrambling of the bytes scrambled according to Table B. The microcomputer examines the four most significant bits of the checksum code in step 312 and then obtains from Table B', in accordance with step 314, the correct de-scrambling method for purposes of performing a reverse scrambling operation in accordance with step 316.

Reference is now made to Table B' produced below.

TABLE B'

| Checksum Code | Key to De-scrambling Method | | | |
|---|---|---|---|---|
| | De-scrambling Method | | | |
| 0000XXXX | 1. | Invert - | Shift Right | 1 - XOR with SCC-1 |
| 0001XXXX | 2. | | Shift Right | 1 - XOR with SCC-1 |
| 0010XXXX | 3. | Invert - | Shift Right | 2 - XOR with SCC-1 |
| 0011XXXX | 4. | | Shift Right | 2 - XOR with SCC-1 |
| 0100XXXX | 5. | Invert - | Shift Right | 3 - XOR with SCC-1 |
| 0101XXXX | 6. | | Shift Right | 3 - XOR with SCC-1 |
| 0110XXXX | 7. | Invert - | Shift Right | 4 - XOR with SCC-1 |
| 0111XXXX | 8. | | Shift Right | 4 - XOR with SCC-1 |
| 1000XXXX | 9. | Invert - | Shift Left | 1 - XOR with SCC-1 |
| 1001XXXX | 10. | | Shift Left | 1 - XOR with SCC-1 |
| 1010XXXX | 11. | Invert - | Shift Left | 2 - XOR with SCC-1 |
| 1011XXXX | 12. | | Shift Left | 2 - XOR with SCC-1 |
| 1100XXXX | 13. | Invert - | Shift Left | 3 - XOR with SCC-1 |
| 1101XXXX | 14. | | Shift Left | 3 - XOR with SCC-1 |
| 1110XXXX | 15. | Invert - | Shift Left | 4 - XOR with SCC-1 |
| 1111XXXX | 16. | | Shift Left | 4 - XOR with SCC-1 |

For example, if the checksum code for the four most significant bits is 0111, then it is known that the data that has been received was scrambled at the transmitter by performing an exclusive OR for each byte in the digital code with the first byte SCC-1 in the sequence control code which is then shifted left by four places with no inversion. Performing the opposite or reverse operation, each bit will be shifted right four places and then each byte will be exclusively ORed with byte SCC-1 (except SCC-1), and then placed in the temporary register at the receiver's microcomputer pursuant to step 318.

In step 320, the checksum of the true data is calculated. In step 322, the resulting checksum is compared with the received checksum code being retained in register 100. If the calculated and received checksum codes match, then the program proceeds to step 324 discussed below. If a match is not obtained then this indicates that an invalid digital signal was received and a determination is made as to whether or not the power down conditions have been satisfied in step 326. If the microcomputer is finished looking for a digital signal (e.g., if more than a specified minimum "awake" interval has elapsed since power-up), then the conditions are satisfied to power down and the microcomputer can be placed in a standby condition to thereby return to step 300 and await sensing of a new digital signal. If the power down conditions are not satisfied, as in the case where the microcomputer is not finished looking for a digital signal (e.g., the minimum "awake" interval has not yet elapsed), then the computer will return to step 304 and then continue to read and store incoming signals and repeat steps 306 through 322.

If the calculated and received checksum codes match in step 322, then, in step 324, the security code in register 100 is read. In decision step 328 the security code in register 100 is compared with the security code of the received signal to determine whether authorized security code A (identifying a first acceptable transmitter) matches the received security code. If a match is not obtained, then authorized security code B (identifying a second acceptable transmitter) is retrieved (step 330) and compared with the received code (step 332). If a match is not found here, either, the microcomputer again jumps to step 326 to determine whether the power down conditions are satisfied.

Returning now to step 328, if the security code A in register 100 matches the received security code, then the program advances to step 334 (FIG. 4B) wherein the appropriate security code A is read from register 100 for purposes of updating the sequence control code. In step 336, the appropriate sequence control code A is read from register 102. This is the old sequence control code and the next sequence control code is calculated by incrementing (or decrementing) the old sequence control code in accordance with instructions retrieved from Table A (indicated at 338 in FIG. 4B). Table A is accessed in accordance with a four bit nibble formed by assembling together the most significant bits in each of the four bytes in the security code read from register 100 in step 334. The look-up Table A responds with the correct increment/decrement algorithm from the Table. The new sequence control code is calculated at step 340. For example, if the most significant bits of the four bytes in the security code read from register 100 combine to form the nibble 0011, then the next sequence control code is calculated by incrementing the old code by seven. Also, if the digital value of the present or old sequence control code at byte 3 (SCC-3) is 00000001 (decimal 1) then the next valid byte 3 in the series will be 00001000 (decimal 8). For a series of eight sequence control codes, the foregoing will be followed by 00001111 (decimal 15), 00010110 (decimal 22), 00011101 (decimal 29), 00100100 (decimal 36), 00101011 (decimal 43), 00110010 (decimal 50) and 00111001 (decimal 57). In this sequence there have been N sequence control codes, wherein $N=8$.

Having calculated the next eight sequence control codes, each calculated sequence control code, in step 342, is compared with the sequence control code embedded in the received digital signal S in order to determine whether the two match. If the received sequence control code matches any of the eight newly calculated sequence control codes, then the program operation branches to step 344, during which the sequence control code is updated to reflect the received sequence control code and written into the appropriate sequence control register 102 or 106. The matching of the sequence control codes provides the required confirmation that a valid digital signal S has been received by the receiver. In step 346, the microcomputer finally performs the requested function of either locking the vehicle door, or unlocking the vehicle door, or opening the trunk lid in dependence upon the function represented by the function code stored in register 108 at the receiver. Once the requested function has been performed, a decision is made at step 348 as to whether the power down conditions have been satisfied. If so, the microcomputer steps to a power-down standby condition awaiting reception of a new digital signal from a transmitter. On the other hand, if the power-down conditions are not satisfied, the microcomputer will jump to step 304 to thus continue to read and store incoming signals.

Step 342 may be considered as an option 1 step. In addition to step 342 an option 2 step may be employed in the event that the received sequence control code does not match with one of the N calculated sequence control codes from step 340. Whether or not an option 2 step is employed is determined and implemented when the receiver is programmed. If the option 2 step is employed then, whenever step 342 determines that no match was found between the received sequence code and any one of the N calculated sequence control codes, a decision is made to go to step 350 (option 2 step) if option 1 (step 342) was not selected to the exclusion of step 342. Otherwise, the microcomputer jumps to step 348 to determine whether the power down conditions have been satisfied, as previously discussed. If step 352 results in a negative decision, the microcomputer advances to step 350.

In step 350 (option 2 step) the microcomputer determines if the function code is "LOCK" meaning that the function requested is to lock the vehicle's doors. If so and if the received sequence control code is of a value greater than any of the N calculated new sequence control codes (from step 340), then the received signal is considered a validly received digital signal. In step 344 the sequence control code is updated with the sequence control code of the received signal. If either (a) the command was not a "LOCK" command or (b) the received sequence control code is not higher than the calculated next step, then the received signal is not considered valid and therefore the requested output function is not performed and the microcomputer commands that the system be powered down.

It is possible for the transmitter and receiver to become out of synchronism as a result of the transmitter being activated outside the range of the system, or when within range, random noise prevents correct transmission of a signal to the receiver. Whenever the operator realizes that the receiver might be out of synchronism, all the operator is required to do (when option 2 is used) is activate the LOCK switch 12 on the transmitter and the system will become re-synchronized. Thus, whenever the system is out of synchronism, the transmitted sequence control code will always be higher than the receiver's stored sequence control code and higher than any of the N calculated new sequence control codes (from step 340). In step 350, as discussed above, the received signal will be considered valid and in step 344 the sequence control code is updated with the sequence control code of the received signal. The system is now re-synchronized. Therefore, any would-be thief who has captured and recorded a previously transmitted digital signal containing a LOCK command will not be able to re-synchronize the system since his recorded sequence control code would be lower than, or at best equal to, the current sequence control code in the receiver.

The initial synchronization of the system takes place during the programming of the securing code as described in my previous U.S. Pat. No. 4,881,148. The procedure requires that a hardwired input (programming pin) in the receiver be grounded and then any of the switches 12, 14, or 16 on the transmitter be actuated. This step causes the security code and the current sequence control code of the transmitter to be received and then stored in the EEPROM memory of the receiver.

It is to be noted that the checksum code does more than provide the key to the scrambling and data arrangement order methods. This code also serves as a check on the accuracy of the transmitted message. Its use herein permits more information (scrambling and order methods) to be transmitted without adding more bits to the transmitted signal.

It is to be further noted that it is quite likely that different scrambling methods will be employed in consecutive transmissions of digital signals using the same transmitter. This adds to the degree of difficulty in trying to analyze a captured digital signal.

From the above description of the invention, those skilled in the art will perceive improvements, changes and modifications. Such improvements, changes and modifications within the skill of the art are intended to be covered by the appended claims.

Having described the invention, the following is claimed:

1. A transmitter for use in a remote control keyless security system for remotely controlling the locking and unlocking control functions of a locking means on a vehicle or the like having a receiver mounted on said vehicle, said transmitter being located remote from said receiver, wherein said transmitter comprises:

an actuatable switch means representative of a control function to be performed by said locking means;

signal transmission means including circuit means responsive to actuation of said switch means for transmitting a digital signal including a first portion having a multi-bit security code uniquely identifying said transmitter from a plurality of similar transmitters, and a multi-bit sequence control code adapted to be sequentially changed in response to each actuation of a said switch means and wherein said security code contains information defining one of a predetermined plurality of different sequence algorithms for use in changing the digital value of said sequence control code;

said transmitter including means responsive to each actuation of a said switch means for sequentially and selectively changing the digital value of said sequence control code with each change being dependent upon said one of said sequence algorithms selected in accordance with said information contained in said security code identifying said transmitter.

2. A transmitter as set forth in claim 1 including a plurality of said actuatable switch means for each representing a control function to be performed by said locking means.

3. A transmitter as set forth in claim 1 including memory means for storing data representing said plurality of different sequence algorithms.

4. A transmitter as set forth in claim 3 wherein said memory means includes a plurality of addressable storage locations each storing data representing a different one of said plurality of different sequence algorithms.

5. A method of controlling the locking and unlocking control functions of a locking means mounted on a vehicle or the like and comprising the steps of:

mounting a receiver on said vehicle;

receiving a digital signal at said receiver from a remotely located transmitter, and wherein said received digital signal includes a first portion having a multi-bit security code uniquely identifying said transmitter from that of a plurality of similar transmitters, and a multi-bit sequence control code adapted to be sequentially changed in response to each transmission of a said digital signal and wherein said security code contains information defining one of a predetermined plurality of different sequence algorithms for use in changing the digital value of said sequence control code; and, storing a multi-bit receiver security code identifying a specific transmitter from which a transmitted digital signal may be validly received;

comparing said received security code with said stored security code to determine if the security codes match;

storing a multi-bit sequence control code at said receiver;

responding to each occurrence of a match between said security codes for reading said stored sequence control code and selectively changing its digital value to define an updated sequence control code having a digital value dependent upon said one of said sequence algorithms selected in accordance with said information contained in the stored security code;

comparing said updated sequence control code with said received sequence control code and providing an output indication in dependence upon the comparison; and responding to the function code for controlling the locking means in dependence thereon.

6. A transmitter for use in a remote control keyless security system for remotely controlling the locking and unlocking control functions of a locking means on a vehicle or the like having a receiver mounted on said vehicle, said transmitter being located remote from said receiver, wherein said transmitter comprises:

an actuatable switch means representative of a control function to be performed by said locking means;

signal transmission means including circuit means responsive to actuation of said switch means for transmitting a digital signal including a first portion having a multi-bit security code uniquely identifying said transmitter from a plurality of similar transmitters, and a multi-bit sequence control code adapted to be sequentially changed in response to each actuation of a said switch means;

said transmitter including means responsive to each actuation of a said switch means for sequentially and selectively changing the digital value of said sequence control code with each change being dependent upon information contained in said security code identifying said transmitter; and wherein said digital signal transmitted by said transmitter includes said first portion and a second portion wherein said second portion has a multi-bit second code and wherein said second code changes in dependence upon any changes in the digital value of said first portion and wherein the codes in said first portion are arranged in order for transmission in accordance with one of a fixed plurality of transmission order algorithms and wherein said second portion is generated for a primary purpose unrelated to any of said transmission order algorithms but wherein a secondary purpose is to describe said one of a fixed plurality of transmission order algorithms for selection in accordance with said second portion.

7. A transmitter as set forth in claim 6 wherein the digital signal transmitted by said transmitter has said codes in said first portion scrambled in accordance with one of a plurality of scrambling algorithms.

8. A transmitter as set forth in claim 7 wherein said second code includes information as to which one of said transmission order algorithms was employed in arranging the order of the codes in said first portion for transmission by said transmitter.

9. A transmitter for use in a remote control keyless security system for remotely controlling the locking and unlocking control functions of a locking means on a vehicle or the like having a receiver mounted on said vehicle, said transmitter being located remote from said receiver, wherein said transmitter comprises:

an actuatable switch means representative of a control function to be performed by said locking means;

signal transmission means including circuit means responsive to actuation of said switch means for transmitting a digital signal including a first portion having a multi-bit security code uniquely identifying said transmitter from a plurality of similar transmitters, and a multi-bit sequence control code adapted to be sequentially changed in response to each actuation of a said switch means;

said transmitter including means responsive to each actuation of a said switch means for sequentially and selectively changing the digital value of said sequence control code with each change being dependent upon information contained in said security code identifying said transmitter; and wherein said digital signal transmitted by said transmitter includes said first portion and a second portion wherein said second portion has a multi-bit second code and wherein said second code changes in dependence upon any changes in the digital value of said first portion and wherein said first portion is scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

10. A portable transmitter for remotely controlling at least one function on a vehicle in a secure manner, comprising:

a small, hollow transmitter housing adapted for easy transportation in a person's pocket;

a manually operable switch mounted in said housing and manually operable from the outside of said housing to control operation of the function;

electronic means contained within said housing and responsive to said switch for (a) generating a message for transmission to the vehicle, said message containing a control code indicative of the desired operation and a security code uniquely identifying said transmitter, (b) generating a second code which changes from time to time in accordance with any changes in said message, (c) scrambling said message in dependence upon the second code and one of a fixed plurality of scrambling algorithms and wherein said second code is generated for a primary purpose unrelated to any of said scrambling algorithms but wherein a secondary purpose is to describe said one of a fixed plurality of scrambling algorithms for selection in accordance with said second code, and (d) transmitting said scrambled message and said second code to said vehicle; and portable power source means contained within said housing for powering said electronic means.

11. A receiver for a remote control keyless security system for remotely controlling the locking and unlocking control functions of a locking means mounted on a vehicle or the like wherein said receiver is adapted to be mounted on a said vehicle, said receiver including:

means for receiving a digital signal from a remote transmitter wherein said received digital signal includes a first portion having a multi-bit security code uniquely identifying said transmitter from that of a plurality of similar transmitters, and a multi-bit sequence control code adapted to be sequentially changed in response to each transmission of a said digital signal, and wherein said security code contains information defining one of a predetermined plurality of different sequence algorithms for use in changing the digital value of said sequence control code, and a multi-bit function code identifying one of a plurality of said control functions to be performed by said lock means;

security code memory means for storing a multi-bit receiver security code identifying a specific transmitter from which said receiver may validly receive a transmitted digital signal;

means for comparing said received security code with said stored security code to determine if said security codes match;

sequence code memory means for storing a multi-bit sequence control code;

means responsive to each occurrence of a said match between said security codes for reading said stored sequence control code and selectively changing its digital value to define an updated sequence control code with each change having a digital value dependent upon said one of said sequence algorithms selected in accordance with said information contained in said stored security code;

means for comparing said updated sequence control code with said received sequence control code; and means responsive to said function code for controlling said locking means in dependence thereon.

12. A receiver for a remote control keyless security system for remotely controlling the locking and unlocking control functions of a locking means mounted on a vehicle or the like wherein said receiver is adapted to be mounted on a said vehicle, said receiver including:

means for receiving a digital signal from a remote transmitter wherein said received digital signal includes a first portion having a multi-bit security code uniquely identifying said transmitter from that of a plurality of similar transmitters, and a multi-bit sequence control code adapted to be sequentially changed in response to each transmission of a said digital signal, and a multi-bit function code identifying one of a plurality of said control functions to be performed by said lock means;

security code memory means for storing a multi-bit receiver security code identifying a specific transmitter from which said receiver may validly receive a transmitted digital signal;

means for comparing said received security code with said stored security code to determine if said security codes match;

sequence code memory means for storing a multi-bit sequence control code;

means responsive to each occurrence of a said match between said security codes for reading said stored sequence control code and selectively changing its digital value to define an updated sequence control code with each change having a digital value dependent upon information contained in said stored security code;

means for comparing said updated sequence control code with said received sequence control code; and means responsive to said function code for controlling said locking means in dependence thereon; and wherein said received digital signal includes said first portion and a second portion wherein said second portion has a multi-bit second code and wherein said second code changes in dependence upon any changes in the digital value of said first portion and wherein said codes in said first portion are scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

13. A receiver as set forth in claim 12 including means for de-scrambling said codes in the first portion of said received digital signal in dependence upon information contained in said second code.

14. A method of operating a portable transmitter to remotely control at least one function on a vehicle, comprising the steps of:

providing a manually operable switch on said transmitter for use in manually signalling that a function on the vehicle is to be operated;

responding to the operation of the manually operable switch by generating a control code for transmission to the vehicle for controlling a function on the vehicle;

providing a security code uniquely identifying that particular transmitter;

providing a second code which changes from time to time in accordance with any changes in said security code or said control code;

selecting a scrambling algorithm from a fixed plurality of scrambling algorithms in accordance with the second code; and wherein said second code is generated for a primary purpose unrelated to any of said scrambling algorithms but wherein a secondary purpose is to describe said selected scrambling algorithm of said fixed plurality of scrambling algorithms for selection in accordance with said second portion;

providing a first message including the control code and the security code;

scrambling the first message according to the selected scrambling algorithm;

providing a second message including the first message and the second code;

transmitting the second message to a said vehicle.

15. A receiver for a remote control keyless security system for remotely controlling the locking and unlocking control functions of a locking means mounted on a vehicle or the like wherein said receiver is adapted to be mounted on a said vehicle, said receiver including:

means for receiving a digital signal from a remote transmitter wherein said received digital signal includes a first portion having a multi-bit security code uniquely identifying said transmitter from that of a plurality of similar transmitters, and a multi-bit sequence control code adapted to be sequentially changed in response to each transmission of a said digital signal, and a multi-bit function code identifying one of a plurality of said control functions to be performed by said lock means;

security code memory means for storing a multi-bit receiver security code identifying a specific transmitter from which said receiver may validly receive a transmitted digital signal;

means for comparing said received security code with said stored security code to determine if said security codes match;

sequence code memory means for storing a multi-bit sequence control code;

means responsive to each occurrence of a said match between said security codes for reading said stored sequence control code and selectively changing its digital value to define an updated sequence control cod with each change having a digital value dependent upon information contained in said stored security code;

means for comparing said updated sequence control code with said received sequence control code; and means responsive to said function code for controlling said locking means in dependence thereon; and wherein said received digital signal includes said first portion and a second portion wherein said second portion has a multi-bit second code and wherein said second code changes in dependence upon any changes in the digital value of said first portion and wherein the codes in said first portion are arranged in order in accordance with one of a fixed plurality of transmission order algorithms and wherein said second portion is generated for a primary purpose unrelated to any of said transmission order algorithms but wherein a secondary purpose is to describe said one of a fixed plurality of transmission order algorithms for selection in accordance with said second portion.

16. A receiver as set forth in claim 15 including means for rearranging the order of said codes in the first portion of said received digital signal in dependence upon information contained in the said second code.

17. A receiver as set forth in claim 15 wherein said received digital signal has said codes in said first portion scrambled in accordance with one of a plurality of scrambling algorithms.

18. A receiver as set forth in claim 17 wherein said second code includes information as to which one of said transmission order algorithms was employed in arranging the order of the codes in said first portion for transmission by said transmitter.

19. A receiver as set forth in claim 18 wherein said receiver includes means for rearranging the order of the codes in the first portion of said received digital signal in dependence upon information contained in said second code.

20. A method of controlling the locking and unlocking control functions of a locking means mounted on a vehicle or the like and comprising the steps of:

mounting a receiver on a said vehicle;

positioning a signal transmitter at a location remote from said receiver;

actuating one of a plurality of switch means provided at the transmitter wherein each switch means represents one of a plurality of control functions to be performed by said locking means.;

responding to actuation of a said switch means for transmitting a digital signal including a first portion having a multi-bit security code uniquely identifying said transmitter from that of a plurality of similar transmitters, and a multi-bit sequence code adapted to be sequentially changed in response to each actuation of a said switch means;

sequentially and selectively changing the digital value of said sequence control code in response to successive actuation of a said switch means with each change being dependent upon said one of said sequence algorithms selected in accordance with said information contained in said security code identifying said transmitter;

receiving a said digital signal at said receiver;

storing a multi-bit receiver security code at said receiver identifying a specific transmitter from which said receiver may validly receive a transmitted digital signal;

comparing said received security code with said stored receiver security code to determine whether said security codes match;

storing a multi-bit sequence control code at said receiver;

responding to each occurrence of a match between said security codes for reading said stored sequence control code and selectively changing its digital value to define an updated sequence control code having a digital value dependent upon information contained in said stored receiver security code;

comparing said updated sequence control code with said received sequence control code and providing an output indication in dependence upon said comparison;

responding to said function code for controlling said locking means in dependence thereon; and wherein said step of transmitting said digital signal includes transmitting said first portion and transmitting a second portion wherein said second portion has a multi-bit second code and wherein said second code changes in dependence upon any changes in the digital value of said first portion and wherein the codes in said first portion are arranged in order for transmission in accordance with one of a fixed plurality of transmission order algorithms and wherein said second portion is generated for a primary purpose unrelated to any of said transmission order algorithms but wherein a secondary purpose is to describe said one of a fixed .plurality of transmission order algorithms for selection in accordance with said second portion.

21. A remote control keyless security system for remotely controlling the locking and unlocking control functions of a locking means mounted on a vehicle or the like and comprising:

a transmitter and a receiver wherein said receiver is mounted on said vehicle and said transmitter is located remote from said receiver;

said transmitter having a plurality of selectively actuatable switch means each representative of a control function to be performed by said locking means and signal transmission means including circuit means responsive to actuation of one of said switch means for transmitting a digital signal including a first portion having a multi-bit security code uniquely identifying said transmitter from that of a plurality of similar transmitters, and a multi-bit sequence control code adapted to be sequentially changed in response to each actuation of a said switch means and wherein said security code contains information defining one of a predetermined plurality of different sequence algorithms for use in changing the digital value of said sequence control code;

said transmitter including means responsive to each actuation of a said switch means for sequentially and selectively changing the digital value of said sequence control code with each change being dependent upon said one of said sequence algorithms selected in accordance with said information contained in said security code identifying said transmitter;

said receiver including means for receiving said digital signal and including:

security code memory means for storing a multi-bit receiver security code identifying a specific transmitter from which said receiver may validly receive a transmitted digital signal;

means for comparing said received security code with said stored receiver security code to determine whether said security codes match;

sequence code memory means for storing a multi-bit sequence control code;

means responsive to each occurrence of a said match between said security codes for reading said stored sequence control code and selectively changing its digital value to define an updated sequence control code having a digital value dependent upon information contained in said stored security code;

means for comparing said updated sequence control code with said received sequence control; and means responsive to said function code word for controlling said locking means in dependence thereon.

22. A remote control keyless security system for remotely controlling the locking and unlocking control functions of a locking means mounted on a vehicle or the like and comprising:

a transmitter and a receiver wherein said receiver is mounted on said vehicle and said transmitter is located remote from said receiver;

said transmitter having a plurality of selectively actuatable switch means each representative of a control function to be performed by said locking means and signal transmission means including circuit means responsive to actuation of one of said switch means for transmitting a digital signal including a first portion having a multi-bit security code uniquely identifying said transmitter from that of a plurality of similar transmitters, and a multi-bit sequence control code adapted to be sequentially changed in response to each actuation of a said switch means;

said transmitter including means responsive to each actuation of a said switch means for sequentially and selectively changing the digital value of said sequence control code with each change being dependent upon information contained in said security code identifying said transmitter;

said receiver including means for receiving said digital signal and including:

security code memory means for storing a multi-bit receiver security code identifying a specific transmitter from which said receiver may validly receive a transmitted digital signal;

means for comparing said received security code with said stored receiver security code to determine whether said security codes match;

sequence code memory means for storing a multi-bit sequence control code;

means responsive to each occurrence of a said match between said security codes for reading said stored sequence control code and selectively changing its digital value to define an updated sequence control code having a digital value dependent upon information contained in said stored security code;

means for comparing said updated sequence control code with said received sequence control;

means responsive to said function code word for controlling said locking means in dependence thereon; and wherein said digital signal transmitted by said transmitter includes said first portion and a second portion wherein said second portion has a multi-bit second code and wherein said second code changes in dependence upon any changes in the digital value of said first portion and wherein said codes in said first portion are scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

23. A system as set forth in claim 22 wherein said receiver includes means for de-scrambling said codes in the first portion of said received digital signal in dependence upon information contained in said second code.

24. A method of controlling the locking and unlocking control functions of a locking means mounted on a vehicle or the like and comprising the steps of:

mounting a receiver on a said vehicle.;

positioning a signal transmitter at a location remote from said receiver;

actuating one of a plurality of switch means provided at the transmitter wherein each switch means represents one of a plurality of control functions to be performed by said locking means;

responding to actuation of a said switch means for transmitting a digital signal including a first portion having a multi-bit security code uniquely identifying said transmitter from that of a plurality of similar transmitters, and a multi-bit sequence code adapted to be sequentially changed in response to each actuation of a said switch means;

sequentially and selectively changing the digital value of said sequence control code in response to successive actuation of a said switch means with each change being dependent upon information contained in said security code identifying said transmitter;

receiving a said digital signal at said receiver;

storing a multi-bit receiver security code at said receiver identifying a specific transmitter from which said receiver may validly receive a transmitted digital signal;

comparing said received security code with said stored receiver security code to determine whether said security codes match;

storing a multi-bit sequence control code at said receiver;

responding to each occurrence of a match between said security codes for reading said stored sequence control code and selectively changing its digital value to define an updated sequence control code having a digital value dependent upon information contained in said stored receiver Security code;

comparing said updated sequence control code with said received sequence control code and providing an output indication in dependence upon said comparison;

responding to said function code for controlling said locking means in dependence thereon; and wherein said step of transmitting said digital signal includes transmitting said first portion together with a second portion wherein said second portion has a multi-bit second code and wherein said second code changes in dependence upon any changes in the digital value of said first portion and wherein said codes in said first portion are scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

25. A remote control keyless security system for remotely controlling the locking and unlocking control functions of a locking means mounted on a vehicle or the like and comprising:

a transmitter and a receiver wherein said receiver is mounted on said vehicle and said transmitter is located remote from said receiver;

said transmitter having a plurality of selectively actuatable switch means each representative of a control function to be performed by said locking means and signal transmission means including circuit means responsive to actuation of one of said switch means for transmitting a digital signal including a first portion having a multi-bit security code uniquely identifying said transmitter from that of a plurality of similar transmitters, and a multi-bit sequence control code adapted to be sequentially changed in response to each actuation of a said switch means;

said transmitter including means responsive to each actuation of a said switch means for sequentially and selectively changing the digital value of said sequence control code with each change being dependent upon information contained in said security code identifying said transmitter;

said receiver including means for receiving said digital signal and including:

security code memory means for storing a multi-bit receiver security code identifying a specific transmitter from which said receiver may validly receive a transmitted digital signal;

means for comparing said received security code with said stored receiver security code to determine whether said security codes match;

sequence code memory means for storing a multi-bit sequence control code;

means responsive to each occurrence of a said match between said security codes for reading said stored sequence control code and selectively changing its digital value to define an updated sequence control code having a digital value dependent upon information contained in said stored security code;

means for comparing said updated sequence control code with said received sequence control;

means responsive to said function code word for controlling said locking means in dependence thereon; and wherein said digital signal transmitted by said transmitter includes said first portion and a second portion wherein said second portion has a multi-bit second code and wherein said second code changes in dependence upon any changes in the digital value of said first portion and wherein the codes in said first portion are arranged in order for transmission in accordance with one of a fixed plurality of transmission order algorithms and wherein said second portion is generated for a primary purpose unrelated to any of said transmission order algorithms but wherein a secondary purpose is to describe said one of a fixed plurality of transmission order algorithms for selection in accordance with said second portion.

26. A system as set forth in claim 25 wherein the digital signal transmitted by said transmitter has each of said codes in said first portion scrambled in accordance with one of a plurality of scrambling algorithms.

27. A system as set forth in claim 25 wherein said receiver includes means for rearranging the order of said codes in the first portion of said received digital signal in dependence upon information contained in the said second code.

28. A system as set forth in claim 25 wherein the digital signal transmitted by said transmitter has said codes in said first portion scrambled in accordance with one of a plurality of scrambling algorithms.

29. A system as set forth in claim 28 wherein said second code includes information as to which one of said transmission order algorithms was employed in arranging the order of the codes in said first portion for transmission by said transmitter.

30. A system as set forth in claim 29 wherein said receiver includes means for rearranging the order of the codes in the first portion of said received digital signal in dependence upon information contained in said second code.

31. A system as set forth in claim 27 wherein the digital signal transmitted by said transmitter has said codes in said first portion scrambled in accordance with one of a plurality of scrambling algorithms.

32. A system as set forth in claim 31 wherein said receiver includes means for rearranging the order of the codes in the first portion of said received digital signal in dependence upon information contained in said second code.

33. A system as set forth in claim 31 wherein said receiver includes means for rearranging the order of the codes in the first portion of said received digital signal in dependence upon information contained in said second code.

34. A method of controlling the locking and unlocking control functions of a locking means mounted on a vehicle or the like and comprising the steps of:

mounting a receiver on a said vehicle;

positioning a signal transmitter at a location remote from said receiver;

actuating one of a plurality of switch means provided at the transmitter wherein each switch means represents one of a plurality of control functions to be performed by said locking means;

responding to actuation of a said switch means for transmitting a digital signal including a first portion having a multi-bit security code uniquely identifying said transmitter from that of a plurality of similar transmitters, and a multi-bit sequence code adapted to be sequentially changed in response to each actuation of a said switch means and wherein said security code contains information defining one of a predetermined plurality of different sequence algorithms for use in changing the digital value of said sequence control code; and, sequentially and selectively changing the digital value of said sequence control code in response to successive actuation of a said switch means with each change being dependent upon said one of said sequence algorithms selected in accordance with said information contained in said security code identifying said transmitter;

receiving a said digital signal at said receiver;

storing a multi-bit receiver security code at said receiver identifying a specific transmitter from which said receiver may validly receive a transmitted digital signal;

comparing said received security code with said stored receiver security code to determine whether said security codes match;

storing a multi-bit sequence control code at said receiver;

responding to each occurrence of a match between said security codes for reading said stored sequence control code and selectively changing its digital value to define an updated sequence control code having a digital value dependent upon information contained in said stored receiver security code;

comparing said updated sequence control code with said received sequence control code and providing an output indication in dependence upon said comparison; and, responding to said function code for controlling said locking means in dependence thereon.

35. A method of controlling the locking and unlocking control functions of a locking means mounted on a vehicle or the like and comprising the steps of:

mounting a receiver on said vehicle;

receiving a digital signal at said receiver from a remotely located transmitter, and wherein said received digital signal includes a first portion having a multi-bit security code uniquely identifying said transmitter from that of a plurality of similar transmitters, and a multi-bit sequence control code adapted to be sequentially changed in response to each transmission of a said digital signal;

storing a multi-bit receiver security code identifying a specific transmitter from which a transmitted digital signal may be validly received;

comparing said received security code with said stored security code to determine if the security codes match;

storing a multi-bit sequence control code at said receiver;

responding to each occurrence of a match between said security codes for reading said stored sequence control code and selectively changing its digital value to define an updated sequence control code having a digital value dependent upon information contained in the stored security code;

comparing said updated sequence control code with said received sequence control code and providing an output indication in dependence upon the comparison;

responding to the function code for controlling the locking means in dependence thereon; and wherein said received digital signal includes said first portion and a second portion wherein said second portion has a multi-bit second code and wherein said second code changes in dependence upon any changes in the digital value of said first portion and wherein the codes in said first portion are arranged in order in accordance with one of a fixed plurality of transmission order algorithms and wherein said second portion is generated for a primary purpose unrelated to any of said transmission order algorithms but wherein a secondary purpose is to describe said one of a fixed plurality of transmission order algorithms for selection in accordance with said second portion.

36. A method as set forth in claim 35 wherein said received digital signal has said codes in said first portion scrambled in accordance with one of a plurality of scrambling algorithms.

37. A method of transmitting a digital signal for use in remotely controlling the locking and unlocking functions of a locking means on a vehicle having a receiver mounted on the vehicle, and comprising the steps of:

locating a signal transmitter at a location remote from a said receiver;

actuating one of a plurality of switch means provided at the transmitter wherein each switch means represents one of a plurality of control functions to be performed by said locking means;

responding to actuation of one of said switch means for transmitting a said digital signal including a first portion having a multi-bit security code uniquely identifying said transmitter from that of a plurality of similar transmitters, and a multi-bit sequence control code adapted to be sequentially changed in response to each actuation of a said switch means and wherein said security code contains information defining one of a predetermined plurality of different sequence algorithms for use in changing the digital value of said sequence control code; and, responding to each actuation of a said switch means by sequentially and selectively changing the digital value of said sequence control code with each change being dependent upon information contained in the security code identifying said transmitter.

38. A method of transmitting a digital signal for use in remotely controlling the locking and unlocking functions of a locking means on a vehicle having a receiver mounted on the vehicle, and comprising the steps of:

locating a signal transmitter at a location remote from a said receiver;

actuating one of a plurality of switch means provided at the transmitter wherein each switch means represents one of a plurality of control functions to be performed by said locking means;

responding to actuation of one of said switch means for transmitting a said digital signal including a first portion having a multi-bit security code uniquely identifying said transmitter from that of a plurality of similar transmitters, and a multi-bit sequence control code adapted to be sequentially changed in response to each actuation of a said switch means;

responding to each actuation of a said switch means by sequentially and selectively changing the digital value of said sequence control code with each change being dependent upon information contained in the security code identifying said transmitter; and wherein said step of transmitting said digital signal includes transmitting said first portion along with a second portion wherein the second portion has a multi-bit second code and wherein said second code changes in dependence upon any changes in the digital value of said first portion, and wherein said codes in said first portion are scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

39. A method of controlling the locking and unlocking control functions of a locking means mounted on a vehicle or the like and comprising the steps of:

mounting a receiver on said vehicle;

receiving a digital signal at said receiver from a remotely located transmitter, and wherein said received digital signal includes a first portion having a multi-bit security code uniquely identifying said transmitter from that of a plurality of similar transmitters, and a multi-bit sequence control code adapted to be sequentially changed in response to each transmission of a said digital signal;

storing a multi-bit receiver security code identifying a specific transmitter from which a transmitted digital signal may be validly received;

comparing said received security code with said stored security code to determine if the security codes match;

storing a multi-bit sequence control code at said receiver;

responding to each occurrence of a match between said security codes for reading said stored sequence control code and selectively changing its digital value to define an updated sequence control code having a digital value dependent upon information contained in the stored security code;

comparing said updated sequence control code with said received sequence control code and providing an output indication in dependence Upon the comparison;

responding to the function code for controlling the locking means in dependence thereon; and wherein said received digital signal includes said first portion along with a second portion wherein said second portion has a multi-bit second code and wherein said second code changes in dependence upon any changes in the digital value of said first portion and wherein the codes in said first portion are scrambled in accordance with one of a fixed plurality of scrambling algorithms and wherein said second portion is generated for a primary purpose unrelated to any of said scrambling algorithms but wherein a secondary purpose is to describe said one of a fixed plurality of scrambling algorithms for selection in accordance with said second portion.

40. A method of transmitting a digital signal for use in remotely controlling the locking and unlocking functions of a locking means on a vehicle having a receiver mounted on the vehicle, and comprising the steps of:

locating a signal transmitter at a location remote from a said receiver;

actuating one of a plurality of switch means provided at the transmitter wherein each switch means represents one of a plurality of control functions to be performed by said locking means;

responding to actuation of one of said switch means for transmitting a said digital signal including a first portion having a multi-bit security code uniquely identifying said transmitter from that of a plurality of similar transmitters, and a multi-bit sequence control code adapted to be sequentially changed in response to each actuation of a said switch means;

responding to each actuation of a said switch means by sequentially and selectively changing the digital value of said sequence control code with each change being dependent upon information contained in the security code identifying said transmitter; and wherein said step of transmitting said digital signal includes transmitting said first portion along with a second portion wherein said second portion has a multi-bit second code and wherein said second code changes in dependence upon any changes in the digital value of said first portion, and wherein the codes in said first portion are arranged in order for transmission in accordance with one of a fixed plurality of transmission order algorithms and wherein said second portion is generated for a primary purpose unrelated to any of said transmission order algorithms but wherein a secondary purpose is to describe said one of a fixed plurality of transmission order algorithms for selection in accordance with said second portion.

41. A method as set forth in claim 40 wherein the digital signal transmitted has said codes in said first portion scrambled in accordance with one of a plurality of scrambling algorithms.

* * * * *

UNITED STATES PATENT AND TRADEMARK OFFICE

CERTIFICATE OF CORRECTION

PATENT NO. : 5,442,341

DATED : August 15, 1995

INVENTOR(S) : George P. Lambropoulos

It is certified that error appears in the above-indentified patent and that said Letters Patent is hereby corrected as shown below:

Column 20, line 46, after "and" begin a new paragraph.

Column 22, line 25, after "and" begin a new paragraph.

Column 22, line 46, after "vehicle" delete --.--.

Column 23, line 13, change "Security" to --security--.

Column 23, line 19, after "and" begin a new paragraph.

Column 24, line 13, after "and" begin a new paragraph.

Column 26, line 10, after "and" begin a new paragraph.

Column 27, line 10, after "and" begin a new paragraph.

Column 27, line 52, change "Upon" to --upon--.

Column 27, line 55, after "and" begin a new paragraph.

Column 28, line 37, after "and" begin a new paragraph.

Signed and Sealed this

Twenty-first Day of May, 1996

*Attest:*

Bruce Lehman

BRUCE LEHMAN

*Attesting Officer*

*Commissioner of Patents and Trademarks*